United States Patent [19]
Nakatani et al.

(10) Patent No.: US 7,587,095 B2
(45) Date of Patent: Sep. 8, 2009

(54) PRINTING APPARATUS

(75) Inventors: Yoshiyuki Nakatani, Wakayama (JP); Naoki Kamikawa, Iwade (JP)

(73) Assignee: Noritsu Koki Co., Ltd., Wakayama-shi, Wakayama (JP)

( * ) Notice: Subject to any disclaimer, the term of this patent is extended or adjusted under 35 U.S.C. 154(b) by 698 days.

(21) Appl. No.: 11/401,118

(22) Filed: Apr. 10, 2006

(65) Prior Publication Data

US 2006/0232834 A1 Oct. 19, 2006

(30) Foreign Application Priority Data

Apr. 15, 2005 (JP) ............................. 2005-118322

(51) Int. Cl.
*G06K 9/40* (2006.01)
(52) U.S. Cl. ...................................... 382/254; 358/504
(58) Field of Classification Search ................ 358/3.02, 358/3.06, 3.09, 3.1, 504; 382/254
See application file for complete search history.

(56) References Cited

U.S. PATENT DOCUMENTS 6,707,579 B1 * 3/2004 Komiya et al. ............... 358/3.1

FOREIGN PATENT DOCUMENTS

JP 2001-142162 5/2001
JP 2005-101831 4/2005

* cited by examiner

*Primary Examiner*—Matthew C Bella
*Assistant Examiner*—Gregory F Cunningham
(74) *Attorney, Agent, or Firm*—Fulbright & Jaworski, L.L.P.

(57) ABSTRACT

Proper correction data is set by scanning a test chart even if the test chart has pixel lines formed thereon as inclined with respect to a secondary scanning direction. A virtual line CL is determined in a middle position in a primary scanning direction on the test chart, which extends between center indices 43C and 44C at opposite ends in the secondary scanning direction of the test chart. A scanning lines SL extending parallel to the virtual line CL is set to each pixel line Q. Sampling areas SQ are set on the scanning line SL. Density data is acquired from a plurality of sampling points formed in each sampling area SQ.

5 Claims, 8 Drawing Sheets

PRINTING APPARATUS

This application claims priority from Japanese Patent Application No. JP 2005-118322 filed Apr. 15, 2005 herein incorporated by reference in its entirety.

BACKGROUND OF THE INVENTION

1. Field of the Invention

This invention relates to a printing apparatus including an exposing head having a plurality of light control elements arranged in a primary scanning direction, the exposing head and a photosensitive material being movable relative to each other in a secondary scanning direction perpendicular to the primary scanning direction, the light control elements being controllable, in time of the relative movement, based on set exposure data to create a test chart; a scanner for scanning the test chart to acquire scanning data; and a correction data generating means for setting correction data to the light control elements based on the scanning data.

2. Description of the Related Art

In an existing printing apparatus having the above construction, a test print sheet (corresponding to the test chart of this invention) is created from printing paper serving as the photosensitive material exposed by a fluorescent print head (corresponding to the exposing head of this invention), a flatbed scanner reads line images from this test print sheet, and a correction table is set based on the density of exposed dot lines read. The correction table obtained in this way is used as data for correcting variations in the luminance of light emitting elements arranged on the exposing head. See Japanese Patent Publication "Kokai" No. 2001-142162 (paragraphs [0011] to [0031] and [0037], and FIGS. 1-15), for example.

In the prior art described in this publication, even numbers and odd numbers are assigned to fluorescent light emitting elements corresponding to the three primary colors of R (red), G (green) and B (blue) constituting the fluorescent print head. These fluorescent light emitting elements are controlled to expose printing paper, thereby to create a test print sheet. The test print sheet has a plurality of test exposed dot lines formed thereon and corresponding to the fluorescent light emitting elements having the even numbers and odd numbers assigned thereto. Then, density is determined of middle positions in a primary scanning direction of the exposed dot lines (i.e. direction of width of the exposed dot lines) acquired by a flatbed scanner, which middle positions are present at predetermined intervals in a secondary scanning direction. Further, an average value of density data in a check window is regarded as a representative density, and a correction coefficient for each fluorescent light emitting element is generated from the representative density and stored in a correction table.

In the above conventional technique, information is acquired from the test print sheet with the flatbed scanner, and densities are acquired from pixels present in the secondary scanning direction and on virtual center lines set to the middle positions in the primary scanning direction of the exposed dot lines (i.e. direction of width of the exposed dot lines). A correction table is set from average values of the densities of the plurality of locations acquired in this way.

However, when scanning the test chart with the scanner to set correction data, improper correction data may be set as a result of acquiring density data from exposed dot lines deviating from target exposed dot lines. This may be caused by a phenomenon of the exposing head and photosensitive material not moving relative to each other with high accuracy when creating the test chart by emitting light from the plurality of light control elements of the exposing head to the photosensitive material. When this phenomenon occurs, the exposed dot lines formed on the test chart are inclined relative to the secondary scanning direction (which is perpendicular to the primary scanning direction). Thus, when sampling points are set in positions spaced in the secondary scanning direction from ends of the exposed dot lines, the sampling points are displaced in the primary scanning direction with reference to proper exposed dot lines, leading to the phenomenon of measuring the density of adjoining exposed dot lines.

This phenomenon may be caused by a situation where the exposing head, which is the movable type, does not move accurately in the direction (secondary scanning direction) perpendicular to the primary scanning direction (i.e. the direction of arrangement of the light control elements), but moves in a direction at an angle, small as it is, to the secondary scanning direction. The test chart created by exposing action of the exposing head moving in the manner described above has the exposed dot lines inclined relative the secondary scanning direction as noted above. There is room for improvement in that proper correction data cannot be generated. This inconvenience arises also with a printing apparatus in which the exposing head is fixed and the photosensitive material is moved for exposure, and when the photosensitive material is not transported properly toward the secondary scanning direction of the exposing head.

SUMMARY OF THE INVENTION

The object of this invention is to provide a printing apparatus for setting proper correcting data by scanning even a test chart having pixel lines formed as inclined relative to a direction perpendicular to a primary scanning direction.

The above object is fulfilled, according to this invention, by a printing apparatus comprising:

an exposing head having a plurality of light control elements arranged in a primary scanning direction, the exposing head and a photosensitive material being movable relative to each other in a secondary scanning direction perpendicular to the primary scanning direction, the light control elements being controllable, in time of the relative movement, based on set exposure data to create a test chart;

a scanner for scanning the test chart to acquire scanning data; and a correction data generating means for setting correction data to the light control elements based on the scanning data; wherein a test print means is provided for forming, on the test chart, a plurality of pixel lines by exposure with the light control elements, and indices indicating an exposure start side and an exposure end side in the secondary scanning direction based on exposure with the same light control element; and the correction data generating means performs a sampling point setting process including a process for setting ends of the plurality of pixel lines from the scanning data, a process for setting a virtual line extending between the index on the exposure start side and the index on the exposure end side, and a process for setting sampling points on a scanning line parallel to the virtual line with reference to the ends of the pixel lines, and a correction data generating process for generating the correction data based on density data of the sampling points set in the sampling point setting process.

With this construction, the correction data generating means set a virtual line extending between the indices on the exposure start side and exposure end side of the scanning data acquired by scanning the test chart with the scanner, and sets sampling points on a scanning line parallel to the virtual line with reference to the end positions of the pixel lines. Thus, the sampling points are sets on an extension of one of the pixel lines, thereby acquiring density data from the target pixel line. As a result, even if the exposing head and photosensitive material fail to move properly relative to each other in the secondary scanning direction in time of creating the test chart, the printing apparatus can set proper correction data from the scanning data.

In this invention, the test chart may have a reference line formed thereon and indicating the primary scanning direction of the exposing head; the sampling point setting process being set to derive a displacement in a direction along the virtual line for a unit distance in the secondary scanning direction from the virtual line and the reference line, thereby to determine the sampling points on the scanning line corresponding to positions set in the secondary scanning direction with reference to the ends of the pixel lines.

With this construction, by deriving a displacement for a unit distance in the secondary scanning direction from the virtual line and the reference line, density data may be acquired with high accuracy from the sampling points in positions set in the secondary scanning direction with reference to the ends of the pixel lines.

In this invention, a plurality of sets of the indices may be formed at predetermined intervals in the primary scanning direction of the exposing head; the correction data generating means being set to perform a process for setting the scanning line based on the plurality of sets of the indices.

With this construction, a plurality of virtual lines may be set based on the plurality of sets of the indices on the exposure start side and exposure end side. Density data may be acquired with high accuracy by using the plurality of virtual lines.

In this invention, the light control elements may have even numbers and odd numbers assigned thereto along a direction of formation; the test chart having a structure including an even-number pixel area having a plurality of pixel lines formed by exposure with the light control elements having the even numbers assigned thereto, and an odd-number pixel area having a plurality of pixel lines formed by exposure with the light control elements having the odd numbers assigned thereto, the even-number pixel area and the odd-number pixel area being spaced apart in the secondary scanning direction, and plural types density areas formed by simultaneous exposure with all of the light control elements and arranged between the even-number pixel area and the odd-number pixel area.

This construction identifies the pixel lines formed by exposure with the plurality of light control elements having specific even numbers and odd numbers assigned thereto, and identifies these light control elements based on the pixel lines in the even-number pixel area or the odd-number pixel area. Then, the density data acquiring process is carried out to acquire density of the plurality of pixel lines in the all-pixel area formed by simultaneous exposure with the light control elements having the even numbers and the odd numbers assigned thereto. Thus, density is obtained with the influences of adjoining areas eliminated as much as possible.

In this invention, the exposing head may include fluorescent light emitting tubes, each having a plurality of light emitting elements arranged in the primary scanning direction and capable of emitting light independently of one another.

With this construction, where the printing apparatus uses the exposing head including fluorescent light emitting tubes, each having a plurality of light emitting elements, correction data may be generated for application to the light emitting elements.

DESCRIPTION OF THE PREFERRED EMBODIMENT

An embodiment of this invention will be described hereinafter with reference to the drawings.

Figure 1:
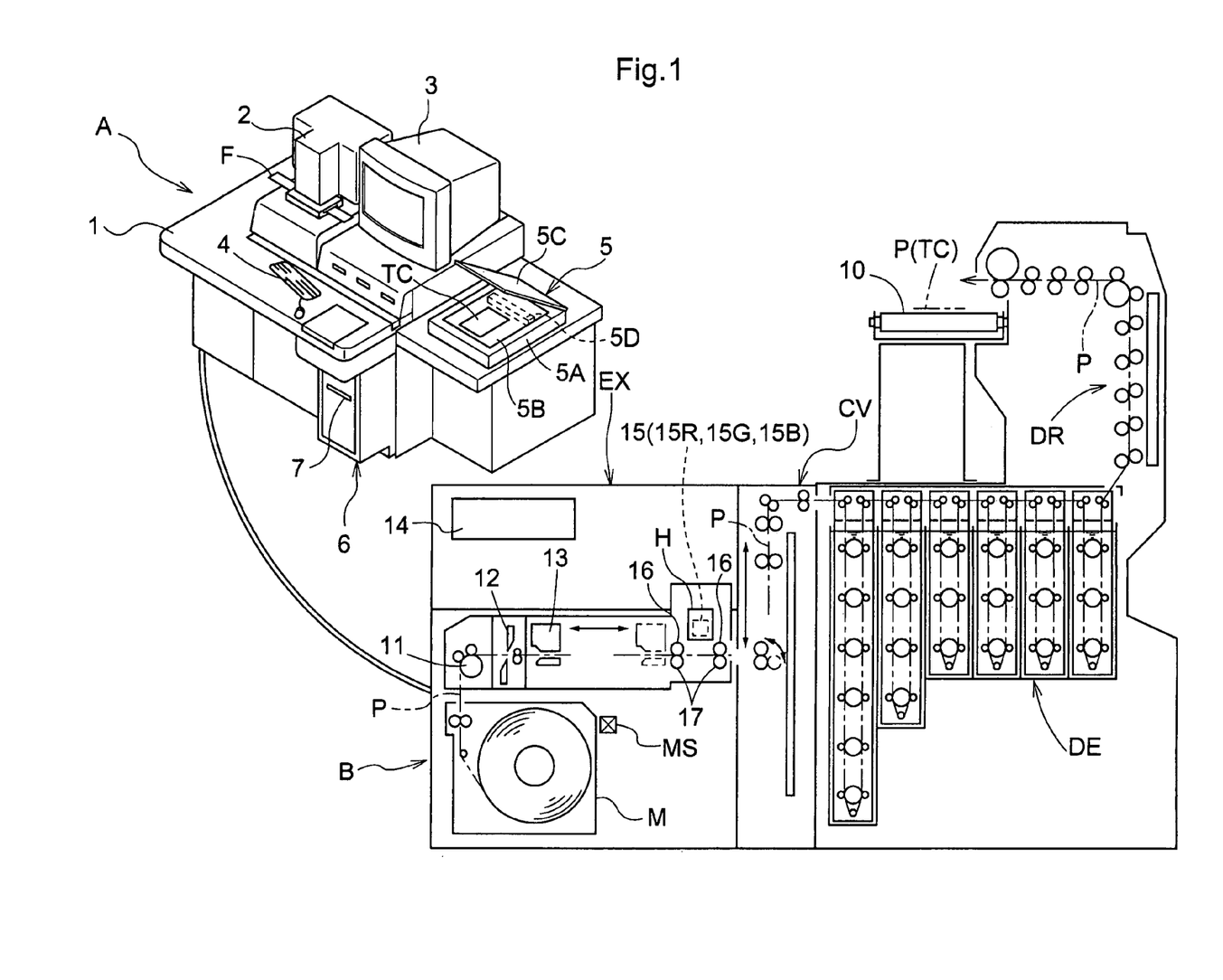
FIG. 1 is a view schematically showing a construction of a photo printing apparatus.

As shown in FIG. 1, a photo printing apparatus includes an operating station A and a printing station B. The operating station A includes a table 1 having, arranged on an upper surface thereof, a film scanner 2 for digitizing and reading image information on photographic film F, a display 3 for displaying process information, and a keyboard 4. A flatbed scanner 5 is disposed laterally of the table 1. A processing unit 6 in the form of a general-purpose computer is disposed under the table 1. This processing unit 6 has a media drive 7 for reading image data recorded on CD-Rs, DVD-Rs and the like, and image data recorded on semiconductor media.

The flatbed scanner 5 has a main body 5A defining a scanning table 5B formed of a transparent glass plate or resin plate, a platen cover 5C for openably covering the scanning table 5B, and a scan head 5D for making parallel movement inside the main body 5A.

The scan head 5D is shaped to extend in a primary scanning direction, and has a light source and photoelectric conversion elements such as CCDs. By moving the scan head 5D, with its light source emitting light, in a secondary scanning direction perpendicular to the primary scanning direction, the photoelectric conversion elements acquire the image of an object set to the scanning table 5B. The flatbed scanner 5 has a resolution capable of acquiring density of each of five or more areas formed by dividing, in the primary scanning direction, each of pixel lines Q (see FIG. 7) extending in the secondary scanning direction, which are formed on printing paper P by light emission from light emitting elements 18.

[Printing Station]

In the printing station B, an exposing section EX exposes image data on printing paper P serving as photosensitive material and cut to a print size. After the exposure, a vertical transport device CV transports the printing paper P upward, as turned over, into a developing section DE. The printing paper P developed in the developing section DE is dried in a drying section DR, and is then fed horizontally onto a conveyer belt 10, and from the conveyer belt 10 out to a sorter (not shown).

In the exposing section EX, a pressure type feed roller 11 takes the printing paper P (an example of photosensitive materials) out of a paper magazine M. A cutter 12 cuts the printing paper P to the print size. A chucker 13 transports the printing paper P horizontally to an exposure position. While the printing paper P is transported in the exposure position horizontally in the secondary scanning direction, image data is exposed by light from an exposing head H. The exposing station EX has a control unit 14 mounted therein.

The exposing head H includes fluorescent light emitting tubes 15 (generic term for three types of fluorescent light emitting tubes 15R, 15G and 15B corresponding to the three primary colors) for emitting lights of R (red), G (green) and B (blue) downward. The exposing head H includes also a pair of exposing transport rollers 16 arranged upstream and downstream of the exposure position with respect to the direction of transport of the printing paper P, and driven rollers 17 opposed to the exposing transport rollers 16.

Figure 2:
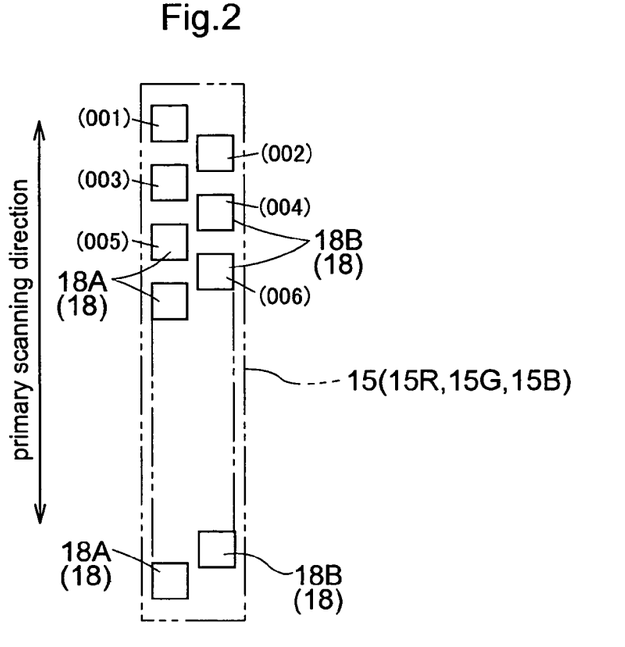
FIG. 2 is a view schematically showing an arrangement of light emitting elements.

This exposing head H has three types of fluorescent light emitting tubes 15R, 15G and 15B corresponding to the three primary colors of R (red), G (green) and B (blue), as described in the Japanese patent publication noted hereinbefore. Each of the fluorescent light emitting tubes 15R, 15G and 15B includes a vacuum case having a light transmitting portion formed of transparent glass (not shown), for example. As shown in FIG. 2, the case has a plurality of light emitting elements 18 (an example of light control elements) arranged in a linear array along the primary scanning direction.

The three types of fluorescent light emitting tubes 15R, 15G and 15B emit lights of the three primary colors by passing lights from the light emitting elements 18 through filters (not shown) corresponding to R (red), G (green) and B (blue). These light emitting elements 18 have luminance thereof controllable by adjusting voltage applied to electrodes corresponding to the respective light emitting elements 18.

Figure 3:
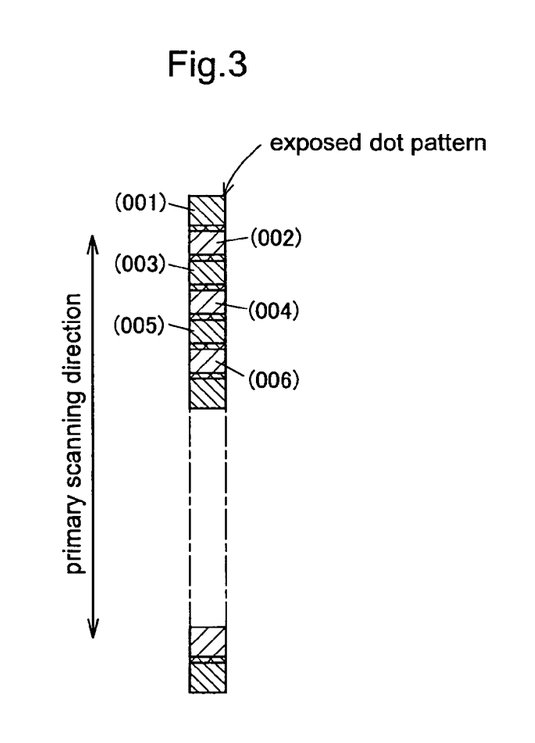
FIG. 3 is a view showing an exposed dot pattern.

The plurality of light emitting elements 18 are arranged in two parallel rows, one of which includes light emitting elements 18A having odd numbers assigned thereto as element numbers, and the other includes light emitting elements 18B having even numbers assigned thereto. The printing paper P may be exposed linearly in the primary scanning direction by controlling emission timing of the light emitting elements 18A having odd numbers assigned thereto as element numbers and the light emitting elements 18B having even numbers assigned thereto as element numbers. In this case, as shown in FIG. 3, exposed dots formed by light emitted from the light emitting elements 18A having odd numbers assigned thereto (i.e. exposed regions (pixels) with odd numbers in parentheses), and exposed dots formed by light emitted from the light emitting elements 18B having even numbers assigned thereto (i.e. exposed regions (pixels) with even numbers in parentheses), slightly overlap one another in the primary scanning direction.

This invention may employ an exposure system constructed, as described in the patent publication noted hereinbefore, for causing the lights of R (red), G (green) and B (blue) from the three types of fluorescent light emitting tubes 15R, 15G and 15B to irradiate positions different in the secondary scanning direction (to expose the same image data by staggering timing). Alternatively, optics such as mirrors may be used for causing the lights of R (red), G (green) and B (blue) from the three types of fluorescent light emitting tubes 15R, 15G and 15B to irradiate the same positions simultaneously.

In particular, the exposing head H may have light emitting diodes only for emitting red light, or light emitting diodes (an example of light control elements) for emitting all colors. Further, in this invention, the exposing head H may include a plurality of shutters of the liquid crystal type (an example of light control elements) arranged along the primary scanning direction, in a path of light from the light source to the printing paper P, and these shutters may be operated to control the quantity of light for each pixel.

The vertical transport device CV has a transporting system for receiving, with pressure type rollers, the printing paper P exposed by the exposing head H, moving the printing paper P upward as turned over, and feeding the printing paper P into the developing section DE. In the developing section DE, rollers including pressure type rollers transport the printing paper P fed therein to successively through a plurality of developing tanks to develop the printing paper P. In the drying section DR, the printing paper P is dried by heat from an infrared heater and drying air from a blower (not shown).

[Control System of the Photo Printing Apparatus]

Figure 4:
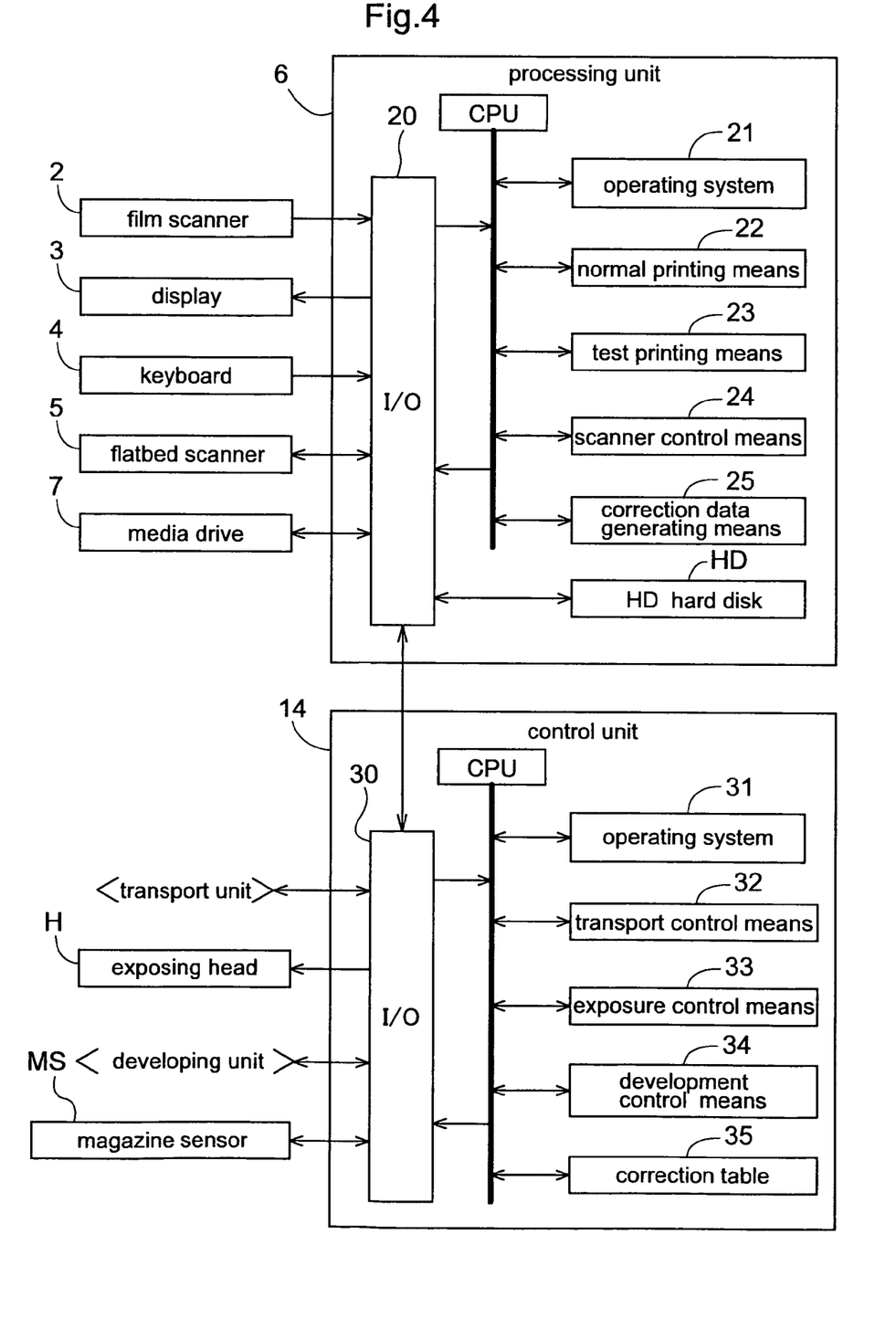
FIG. 4 is a block circuit diagram of a control system.

The photo printing apparatus has a control system which may be depicted as shown in FIG. 4. Specifically, the processing unit 6 includes a microprocessor (CPU), and an input/output interface 20 for inputting and outputting information to/from the microprocessor (CPU). An input/output system is provided for enabling the input/output interface 20 to communicate information with the film scanner 2, display 3, keyboard 4, flatbed scanner 5, media drive 7 and hard disk HD. An input/output system is provided also for enabling a data buss of microprocessor CPU to communicate information with an operating system 21, normal printing means 22, test printing means 23, scanner control means 24, and correction data generating means 25.

The operating system 21 displays on the display 3 information required by the processing unit 6. When, with the information displayed on the display 3, a normal printing process is carried out according to order data, for example, the operating system 21 acts as an interface for acquiring image data to be printed and the order and transferring the data to the normal printing means 22.

The normal printing means 22 transmits image data acquired from the film scanner 2 or media drive 7 and order data acquired through the keyboard 4 to the printing station unit B to perform a printing process. The test printing means 23 creates a test chart TC shown in FIG. 5, by transmitting data from a magazine sensor MS shown in FIG. 1, exposure data for chart creation and control data to the printing station B to print a chart on printing paper P based on the exposure data.

The scanner control means 24 controls the flatbed scanner 5 to acquire scanning data from a scanned object (e.g. printing paper P) set, and input the data to the processing unit 6. The correction data generating means 25 generates correction data by sampling density of selected positions from scanning data acquired by scanning the test chart TC with the flatbed scanner 5, and transmits this correction data to the printing station B for updating (or setting) a correction table 35 (see FIG. 4). Though not described in detail, a correction table 35 is set for each paper type, and a pertinent correction table 35 is updated based on a paper type determined from a code portion 40A (see FIG. 6) of the test chart TC.

The control unit 14 includes a microprocessor (CPU), and an input/output interface 30 for inputting and outputting information to/from the microprocessor (CPU). An input/output system is provided for enabling the input/output interface 30 to communicate information with a transport unit for transporting printing paper P in various parts of the printing station B, exposing head H, a developing unit for performing temperature control surface control of developers in the plurality of developing tanks of the developing section DE, and the magazine sensor MS for determining a type of paper magazine M. An input/output system is provided also for enabling a data buss of microprocessor CPU to communicate information with an operating system 31, a transport control means 32, an exposure control means 33, a development control means 34 and correction table 35.

The operating system 31 performs a process of acquiring signals from a sensor system (not shown), a basic process of outputting control signals to various control systems, and controls operations of the transport control means 32, exposure control means 33 and development control means 34. The transport control means 32 controls the transport unit for transporting printing paper P. The exposure control means 33 controls the exposing head H for exposing image data on the printing paper P. The development control means 34 controls temperature and surface level of processing liquids in the developing section DE. The correction table 35 realizes a process setting luminance levels of the light emitting elements 18 of the respective fluorescent light emitting tubes 15R, 15G and 15B in the exposing head H.

The operating system 21, normal printing means 22, test printing means 23, scanner control means 24 and correction data generating means 25 of the processing unit 6, and the operating system 31, transport control means 32, exposure control means 33 and development control means 34 of the control unit 14, are in the form of software stored in semiconductor memory (not shown). However, these components may be in the form of hardware such as logic, or may be a combination of software and hardware. The control system requires, besides the data buses, a control bus, an address bus and so on to realize control. To avoid complication, the control bus, address bus and interfaces are not shown in the drawings.

This photo printing apparatus is constructed to be capable of correcting, with high accuracy, variations in luminance of the light emitting elements 18 of the fluorescent light emitting tubes 15R, 15G and 15B of the exposing head H based on correction data included in the correction table 35. When performing this luminance correction, the test printing means 23 is operated to expose exposure data set beforehand on printing paper P to create the test chart TC shown in FIG. 5. By scanning this test chart TC with the flatbed scanner 5, the correction data generating means 25 generates correction data to update the correction data of the correction table 35.

Figure 5:
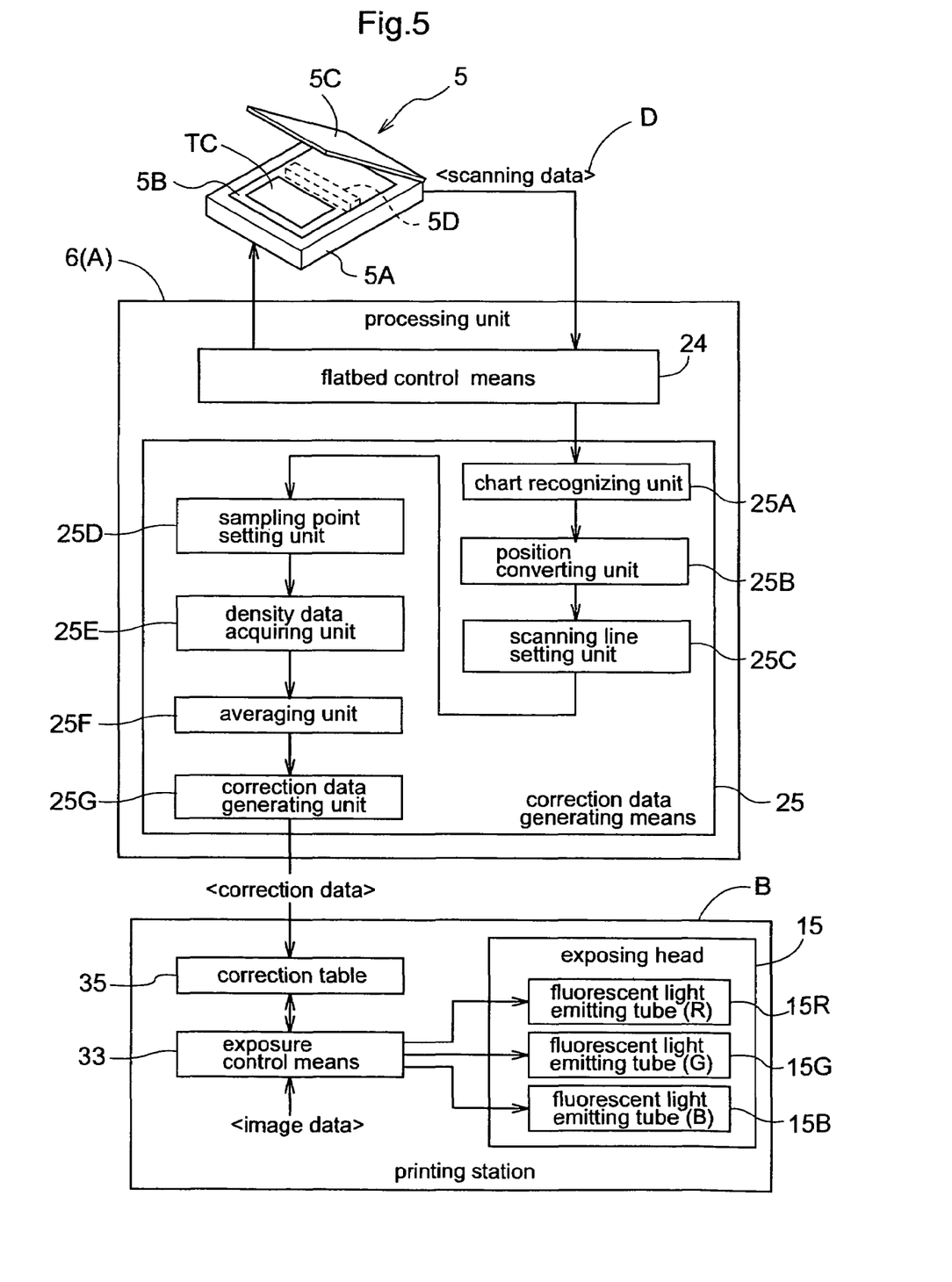
FIG. 5 is a view showing an outline of a processing sequence.

When creating the test chart TC, the exposure control means 33 takes in the correction data of the correction table 35 already set, and transmits exposure data as changed by the correction data to the exposing head H to execute an exposing process. The exposed printing paper P is transported to the developing section DE to be developed, and is then dried in the drying section DR, thereby forming the test chart TC.

[Structure of the Test Chart]

Figure 6:
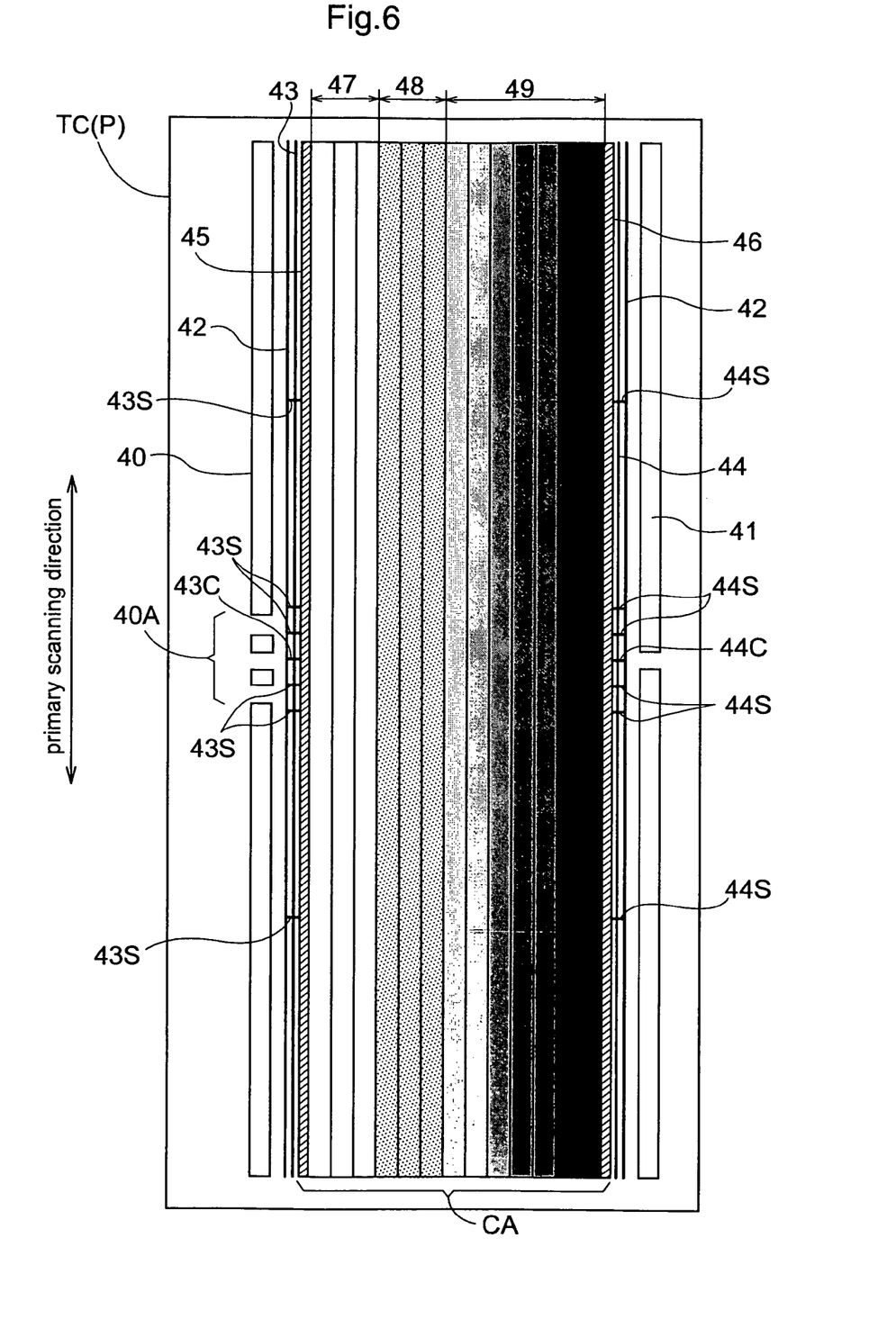
FIG. 6 is a view showing a test chart.

As shown in FIG. 6, the test chart TC has the code portion 40A formed thereon indicating a paper type. The test chart TC further includes a start bar 40 serving as an index showing a front part of the chart, an end bar 41 showing a rear part of the chart, and a chart area CA formed in a region between the start bar 40 and end bar 41. The test chart TC includes also reference lines 42 formed adjacent sides, opposed to each other, of the start bar 40 and end bar 41, and a start-side auxiliary line 43 and an end-side auxiliary line 44 extending parallel to the reference lines 42.

The start bar 40, end bars 41, the pair of reference lines 42, start-side auxiliary line 43 and end-side auxiliary line 44 are formed to extend parallel to the primary scanning direction of the exposing head H. Though processing is not described, the code portion 40A is what is selected as image data that corresponds to the type of printing paper P identified based on the information from the magazine sensor MS.

On the front side and rear side of the chart area CA, a pixel line portion 45 is formed by light emission only from the light emitting elements 18A having odd numbers assigned thereto, and a pixel line portion 46 is formed by light emission only from the light emitting elements 18B having even numbers assigned thereto.

Center indices 43C and 44C are formed in middle positions in the primary scanning direction on the start-side auxiliary line 43 and end-side auxiliary line 44. A plurality of auxiliary indices 43S and 44S are formed in positions adjacent and opposed to each other across the center indices 43C and 44C, and in positions spaced a set distance in the primary scanning direction from the center indices 43. The center indices 43C and 44C are formed by light emission from one light emitting element 18 located in the middle in the primary scanning direction among the light emitting elements 18. The plurality of auxiliary indices 43S and 44S are formed by light emission from common light emitting elements 18 in positions spaced a set distance from the one light emitting element 18 located in the middle in the primary scanning direction.

Figure 7:
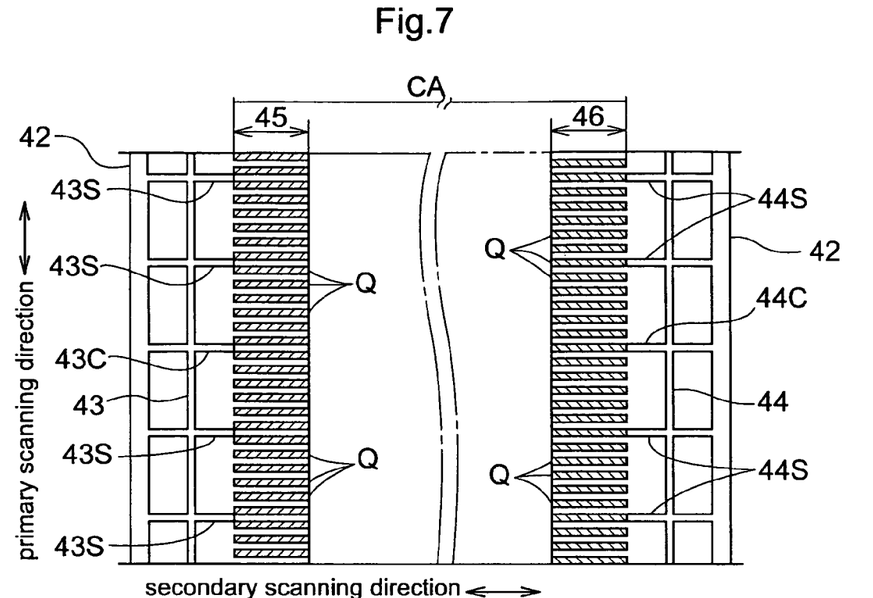
FIG. 7 is an enlarged view showing a structure of the test chart.

The pixel line portions 45 and 46 may be depicted in enlargement as shown in FIG. 7. As seen, the pixel line portion 45 includes a plurality of pixel lines Q formed by light emission from the light emitting elements 18A having odd numbers assigned thereto, and arranged in parallel in the form of comb teeth. The pixel line portion 46 includes a plurality of pixel lines Q formed by light emission from the light emitting elements 18B having even numbers assigned thereto, and arranged in parallel in the form of comb teeth. These pixel lines Q have a width in the primary scanning direction equal to the width of pixels.

The chart area CA includes a primary color area 47 formed in the hues of yellow (Y), magenta (M) and cyan (C) by lights emitted independently of one another from the light emitting elements 18 of the three types, B (blue), G (green) and R (red), of fluorescent light emitting tubes 15B, 15G and 15R, a false coloring area 48 for checking coloring of printing paper P by emitting a particular color light in time of the above light emission, and a gray coloring area 49 having a plurality of tones produced by lights emitted simultaneously in a fixed quantity from the light emitting elements 18 of the three types, B (blue), G (green) and R (red), of fluorescent light emitting tubes 15B, 15G and 15R. It will be noted that the primary color area 47, false coloring area 48 and gray coloring area 49 correspond to an entire pixel area.

[Control Mode]

This photo printing apparatus has a characterizing feature in that the test chart TC is created, the correction data generating means 25 generates correction data automatically by setting the test chart TC to the flatbed scanner 5 and scanning it, and automatically and properly updates (or sets) the correction data on the correction table 35.

The scanning data acquired by scanning the test chart TC set to the flatbed scanner 5 comprises the three types of data corresponding to the three primary colors of R (red), G (green) and B (blue).

As shown in FIG. 5, the correction data generating means 25 includes a chart recognizing unit 25A, a position converting unit 25B, a scanning line setting unit 25C, a sampling point setting unit 25D, a density data acquiring unit 25E, an averaging unit 25F and a correction data generating unit 25G, all in the form of software.

Among the plurality of processing units noted above, the process carried out by the sampling point setting unit 25D corresponds to the sampling point setting process, and the process carried out by the correction data generating unit 25G corresponds to the correction data generating process.

An outline of a process of updating the correction table 35 will be described with reference to FIG. 5. After the test chart TC is created, a mode is selected for the processing unit 6 to update the correction data of the correction table 35. The test chart TC is set to the flatbed scanner 5, and the scanner control means 24 controls the flatbed scanner 5 to acquire scanning data, and transmits the scanning data to the correction data generating means 25.

The scanning data includes coordinate data of pixel positions for the three primary colors of R (red), G (green) and B (blue), and has a data structure with density data corresponding to the coordinate data. The process described hereinafter is carried out for all the three types of density data corresponding to the three primary colors of R (red), G (green) and B (blue).

In the correction data generating means 25, the chart recognizing unit 25A extracts a chart included in the scanning data. The position converting unit 25B determines the position of the chart, and performs a coordinate conversion process for adjusting the position.

More particularly, the reference lines 42 are formed to extend in the primary scanning direction of the exposing head H, and the pixel lines Q extend parallel to the secondary scanning direction. Therefore, the position converting unit 25B determines, from at least one of the reference lines 42, the position (angle of inclination) of the scanning data D with respect to the primary scanning direction (or the secondary scanning direction), and performs a coordinate conversion for rotating the scanning data so that, for example, the reference lines 42 may coincide with the secondary scanning direction of the flatbed scanner 5.

Figure 8:
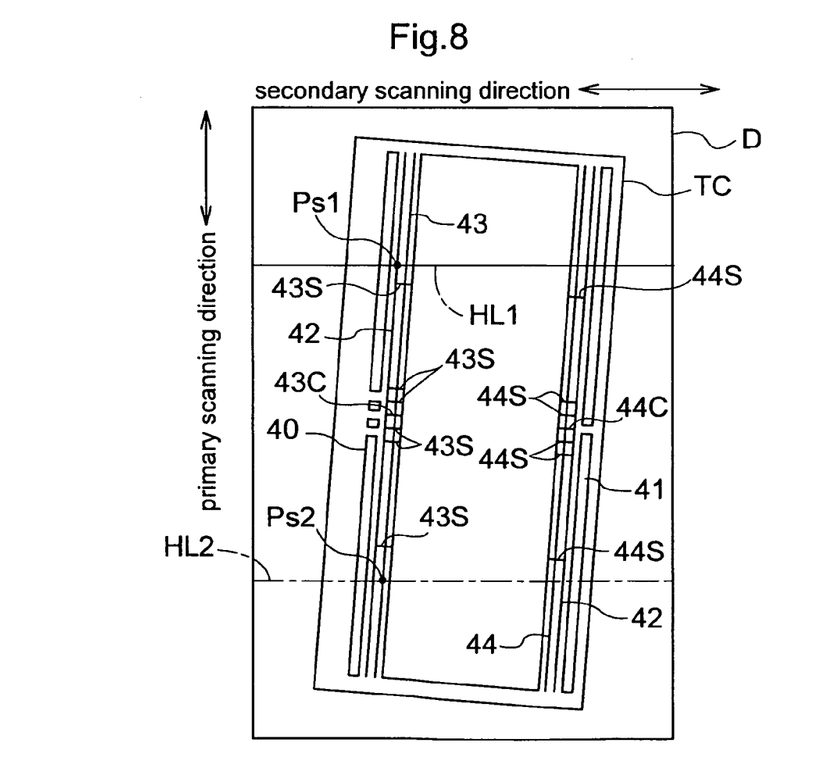
FIG. 8 is a view showing a test chart in scanning data.

In one specific example of process, when, as shown in FIG. 8, the test chart TC is inclined in the scanning data D, coordinates Ps1 and Ps2 are determined of one reference line 42 in about ¼ position and about ¾ position from one end in the primary scanning direction of the scanning data D.

That is, when the reference lines 42 are grasped beforehand by chart recognizing unit 25A and coordinates Ps1 and Ps2 are determined on the reference line 42 adjacent the start bar, the coordinate Ps1 is located at an intersection of the reference line 42 and a line HL1 passing through the about ¼ position in the primary scanning direction of the scanning data D and extending parallel to the secondary scanning direction, and the coordinate Ps1 is located at an intersection of the reference line 42 and a line HL2 passing through the about ¾ position in the primary scanning direction of the scanning data D and extending parallel to the secondary scanning direction.

After specifying the coordinates Ps1 and Ps2 on the reference line 42 in this way, the position of the reference line 42 in the scanning data D is determined from an inclination of a line linking the data of coordinates Ps1 and Ps2 (e.g. X coordinates and Y coordinates). Then, a coordinate conversion is carried out for rotating the scanning data D so that this position may coincide with the primary scanning direction of the scanning data D.

The process carried out by the coordinate converting unit 25B is not required, and is omitted, when the primary scanning direction of the test chart TC is in agreement with the primary scanning direction or secondary scanning direction of the scanning data. As a processing mode of coordinate converting unit 25B, for example, a sampling coordinate system may be generated for determining sampling points SA described hereinafter (FIG. 11), the sampling coordinate system being rotated to adjust its position without rotating the scanning data, thereby to set scanning data in positions overlapping the sampling coordinate system to sampling areas.

Figure 9:
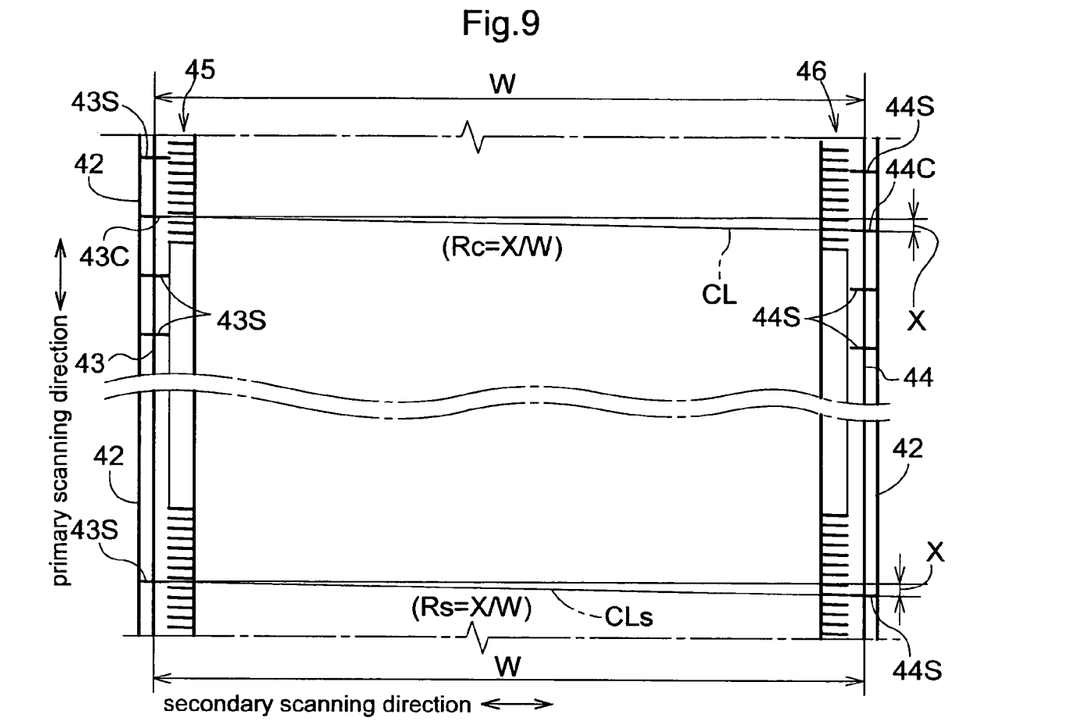
FIG. 9 is a view showing details of an inclination of a virtual line.

Next, as shown in FIG. 9, the scanning line setting unit 25C extracts center indices 43C and 44C from the scanning data D, and generates a virtual line CL extending between these center indices 43C and 44C. Further, the scanning line setting unit 25C samples those of the auxiliary indices 43S and 44S set beforehand from the scanning data D, and evaluates an inclination of a virtual line CLs extending therebetween.

The inclination Rc of the virtual line CL with respect to the secondary scanning direction may be expressed, for example, by Rc=X/W, where W is a distance (unit distance) in the secondary scanning direction between the center indices 43C and 44C, and X is a distance in the primary scanning direction between the center indices 43C and 44C.

In the process of determining the inclination Rc, a position relationship between the center indices 43C and 44C is derived from their coordinates in the scanning data D. Where, as shown in FIG. 9, the inclination Rc in the direction in which the center index 44C is displaced with reference to the center index 43C is regarded as positive, the center index 44C displaced in the opposite direction gives the inclination Rc a negative value.

An inclination Rs of the virtual line CLs between the auxiliary indices 43S and 44S is also determined as described above. When inclination Rs determined in this way is in agreement with or very close to the inclination Rc of the virtual line CL extending between the center indices 43C and 44C, the inclination Rs of the virtual line CLs between the auxiliary indices 43S and 44S is not used in subsequent processes.

The inclination Rs of the virtual line CLs between the auxiliary indices 43S and 44S is used as a supplement when the center indices 43C and 44C are misdetected. When one inclination Rc and at least one of two inclinations Rs are greatly different, the value of a different inclination will be used. That is, when the test chart TC is scanned by the flatbed scanner 5, the center indices 43C and 44C can be misdetected due to dust adhering to the test chart TC, or Newton rings generated when the scanning table 5B and test chart TC stick to each other. When such a misdetection occurs, a virtual line CL is selected based on other inclinations as noted above.

A phenomenon in which the virtual line CLs between the auxiliary indices 43S and 44S inclines with respect to the secondary scanning direction (i.e. the direction perpendicular to the reference lines 42 in FIG. 9) occurs when the printing paper P is not transported in the direction perpendicular to the primary scanning direction of the exposing head H. That is, where a transport roller has an axis thereof extending in the primary scanning direction for transporting the printing paper P in the printing station B, the transporting speed can be different at one end and at the other end in the primary scanning direction of the transport roller.

In such a case, the printing paper P is not transported correctly in the secondary scanning direction perpendicular to the primary scanning direction of exposing head H in time of exposure by the exposing head H. Instead, the printing paper P is transported at an angle to in the secondary scanning direction. The pixel lines Q are thereby formed on printing paper P at an angle to the primary scanning direction. As a result, the pixel lines Q become inclined with respect to the primary scanning direction of the exposing head H. Such a phenomenon may occur also in a printing apparatus constructed for moving the exposing head relative to fixed printing paper P.

The test chart TC may be created with such a characteristic of the transporting system, the pixel lines may be determined in the pixel line portions 45 and 46 from the scanning data acquired from the test chart TC, and density data may be acquired from positions on extensions in the secondary scanning direction from the pixel lines. In this case, the density acquired is that of adjoining pixel lines Q or pixel lines Q in positions displaced in the primary scanning direction. Since proper correction data cannot be acquired, the process of this invention must be performed.

Next, the sampling point setting unit 25D samples the pixel lines Q in the pixel line portions 45 and 46, and determines a correspondence between a plurality of pixel lines Q and light emitting elements 18 (18A, 18B) from a positional relationship with the center index 43C (or from a positional relationship with the center index 44C). Then, the sampling point setting unit 25D sets a sampling area SQ (see FIG. 11) to each pixel line Q, which is defined by a middle area in the primary scanning direction (i.e. an area included in a width range J described hereinafter) and a set area in the secondary scanning direction for acquiring density data (i.e. an area included in a length range K described hereinafter).

That is, when identifying the pixel lines Q, density data in the primary scanning direction of the pixel line portions 45 and 46 on the test chart TC is sampled, and areas of high density are identified as the pixel lines Q. The elements numbers of the corresponding light emitting elements 18 (18A, 18B) are applied to the respective pixel lines Q based on the positional relationship in the primary scanning direction of the pixel lines Q identified and the indices.

Figure 10:
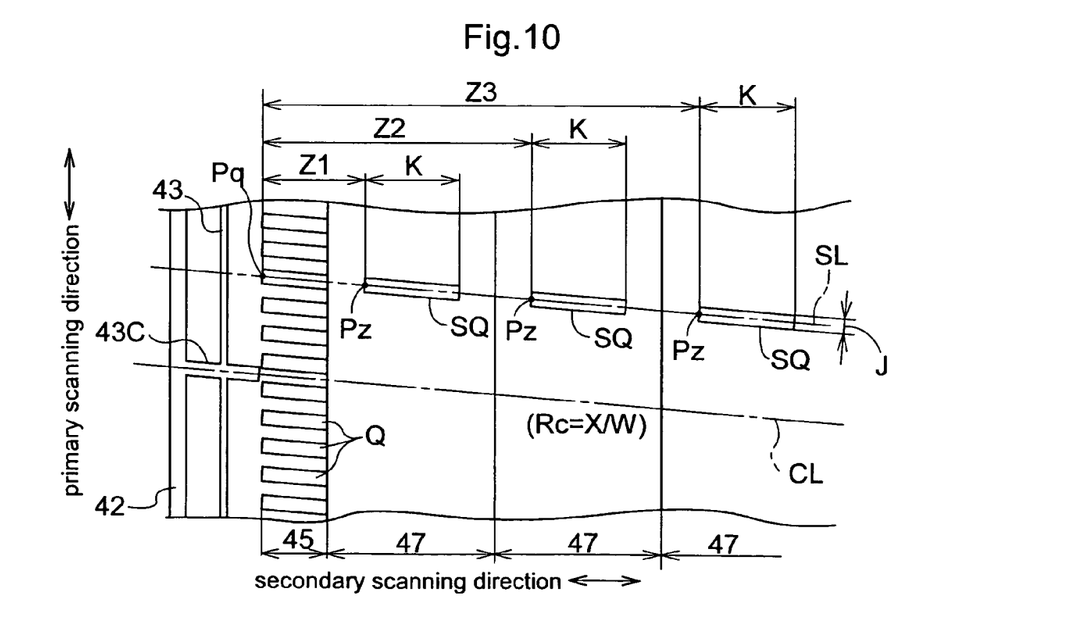
FIG. 10 is a view showing positions of sample areas.
Figure 11:
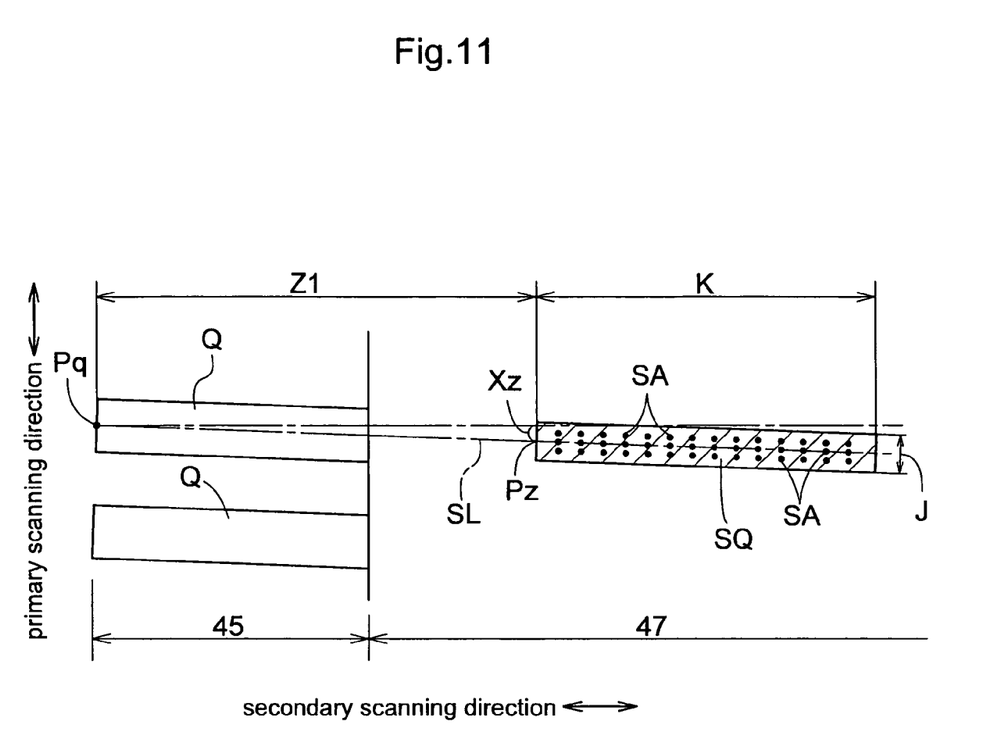
FIG. 11 is a view showing sampling points in the sample areas.

Further, as shown in FIGS. 10 and 11, an end of a pixel line Q is set as reference point Pq, a scanning line SL is set to extend through the reference point Pq and parallel to the virtual line CL, predetermined width ranges J are set in the primary scanning direction with reference to this scanning line SL, length ranges K are set from positions spaced by distances Z1, Z2, Z3 and so on in the secondary scanning direction from the reference point Pq, sampling areas SQ are set as defined by these ranges, and a plurality of sampling points SA are set in each sampling area SQ.

In this process, the scanning line SL may be set only by applying the inclination Rc (gradient) of the virtual line CL as a factor to a straight line passing through the reference point Pq. When setting the sampling area SQ in the position spaced by distance Z1 from the reference point Pq, a displacement Xz in the primary scanning direction is determined by applying the value of distance of Z1 to the scanning line SL. From this displacement Xz and the value of distance Z1 in the secondary scanning direction, coordinates in the primary scanning direction of a sampling start point Pz of the sampling points SA can be determined.

In the process of determining the start point Pz of each sampling area SQ based on the scanning line SL as described above, a distance Pz is determined by multiplying the value of distance Z1 by Rc (value of X/W) as a factor. A position at the distance Z1 on a line extending through the reference point Pq and in the secondary scanning direction is used as a reference, and a position displaced by the distance Pz from this reference is set as the start point Pz.

Next, density data acquiring unit 25E sets the sampling areas SQ based on the coordinates of the start points Pz, sets a plurality of sampling points SA in each sampling area SQ, and acquires density data from each sampling point SA. The averaging unit 25F averages the density data acquired, and stores averaged values with the element numbers applied thereto. When setting a plurality of sampling points SA to each sampling area SQ, three coordinates in the primary scanning direction (e.g. X coordinates) and numerous coordinates in the secondary scanning direction (e.g. Y coordinates) are set with reference to the start point Pz, and a position sharing the coordinates is set as the center of each sampling point SA.

In this process, the sampling areas SQ are set, and thereafter a plurality of sampling points SA are set to each sampling area SQ. Instead, a processing mode may be set, in which data in the secondary scanning direction is set beforehand set as positions of a plurality of sampling points SA from the reference point Pq, and center coordinates of the plurality of sampling points SA are set by multiplying this data by Rc (value of X/W) as a factor.

Take the primary color area 47 for example, averaged density data of the pixel lines Q in the area of the hue of cyan (C) formed by the fluorescent light emitting tube 15R of R (red) is stored with information indicating the fluorescent light emitting tube 15R of R (red) and corresponding pixel numbers.

After the density data is stored for each of the light emitting elements 18 of the three types, R (red), G (green) and B (blue), of fluorescent light emitting tubes 15R, 15G, and 15B, the correction data generating unit 25G generates correction data (e.g. correction coefficient) for equalizing the density in the primary scanning direction. This correction data is stored in overwrite mode in the correction table 35.

Thus, according to this invention, the virtual line CL is set which extends between the center indices 43C and 44C at the exposure start side and exposure end side of the scanning data D acquired by scanning the test chart TC with the flatbed scanner 5, and sampling points SA are set on the scanning line SL extending parallel to the virtual line CL with reference to an end position of a pixel line Q. In this way, the sampling areas SQ are set on an extension of the pixel line Q. Correction data can be generated by acquiring density data of the target pixel line Q from the sampling points SA set in the sampling areas SQ.

The sampling areas SQ are set based on the start points Pz, and a plurality of sampling points SA are set to each sampling area SQ. Thus, a common routine for setting a plurality of sampling points SA to each sampling area SQ can be executed for each pixel line Q, thereby simplifying the software for the processing.

That is, even if the exposing head H and printing paper P fail to move properly relative to each other in the secondary scanning direction in time of creating the test chart TC, the printing apparatus according to this invention can update the correction table 35 with proper correction data created from the scanning data D.

Especially, in order to determine positions of sampling points SA on the scanning line SL, an inclination of the virtual line CL is evaluated, and positions in the secondary scanning direction set beforehand as positions of sampling points SA are multiplied by a numerical value indicating the inclination. In this way, the positions of the sampling points SA in the primary scanning direction are set with high accuracy, to acquire density data of each sampling point SA.

Other Embodiments

This invention may be embodied as follows in addition to the foregoing embodiment:

(a) The exposing head of the printing apparatus may be constructed movable over a sensitized surface of a fixed photosensitive material. Such an exposing head has light control elements such as light emitting diodes arranged in the primary scanning direction, and is moved in the secondary scanning direction.

(b) A processing mode may be set to determine an angle of rotation instead of an inclination of the virtual line CL, and determine positions of sampling points SA by using trigonometric functions, for example.

(c) The scanner may have a fixed scanning unit for acquiring images, and printing paper P is fed to the scanning unit.

This invention is applicable also to a printing apparatus having a scanner for exclusive use in scanning the test chart, and a printing apparatus that develops a photosensitive material without using a developer.

What is claimed is:

1. A printing apparatus comprising:
an exposing head having a plurality of light control elements arranged in a primary scanning direction, said exposing head and a photosensitive material being movable relative to each other in a secondary scanning direction perpendicular to said primary scanning direction, said light control elements being controllable, in time of the relative movement, based on set exposure data to create a test chart;
a scanner for scanning said test chart to acquire scanning data; and
a correction data generating means for setting correction data to said light control elements based on said scanning data;
wherein
a test print means is provided for forming, on said test chart, a plurality of pixel lines by exposure with said light control elements, and indices indicating an exposure start side and an exposure end side in said secondary scanning direction based on exposure with the same light control element; and
said correction data generating means performs a sampling point setting process including a process for setting ends of said plurality of pixel lines from said scanning data, a process for setting a virtual line extending between the index on said exposure start side and the index on said exposure end side, and a process for setting sampling points on a scanning line parallel to said virtual line with reference to the ends of said pixel lines, and a correction data generating process for generating said correction data based on the density data of said sampling points set in said sampling point setting process.

2. A printing apparatus as defined in claim 1, wherein:
said test chart has a reference line formed thereon and indicating the primary scanning direction of said exposing head;
said sampling point setting process being set to derive a displacement in a direction along said virtual line for a unit distance in said secondary scanning direction from said virtual line and said reference line, thereby to determine the sampling points on said scanning line corresponding to positions set in the secondary scanning direction with reference to the ends of said pixel lines.

3. A printing apparatus as defined in claim 1, wherein:
a plurality of sets of said indices are formed at predetermined intervals in the primary scanning direction of said exposing head;
said correction data generating means being set to perform a process for setting said scanning line based on the plurality of sets of said indices.

4. A printing apparatus as defined in claim 1, wherein:
said light control elements have even numbers and odd numbers assigned thereto along a direction of formation;
said test chart having a structure including an even-number pixel area having a plurality of pixel lines formed by exposure with the light control elements having the even numbers assigned thereto, and an odd-number pixel area having a plurality of pixel lines formed by exposure with the light control elements having the odd numbers assigned thereto, the even-number pixel area and the odd-number pixel area being spaced apart in the secondary scanning direction, and plural types density areas formed by simultaneous exposure with all of said light control elements and arranged between the even-number pixel area and the odd-number pixel area.

5. A printing apparatus as defined in claim 1, wherein said exposing head includes fluorescent light emitting tubes, each having a plurality of light emitting elements arranged in the primary scanning direction and capable of emitting light independently of one another.

* * * * *

UNITED STATES PATENT AND TRADEMARK OFFICE
CERTIFICATE OF CORRECTION

PATENT NO. : 7,587,095 B2  Page 1 of 1
APPLICATION NO. : 11/401118
DATED : September 8, 2009
INVENTOR(S) : Nakatani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Twenty-first Day of September, 2010

David J. Kappos
*Director of the United States Patent and Trademark Office*